(12) United States Patent
Kim

(10) Patent No.: US 12,151,830 B2
(45) Date of Patent: Nov. 26, 2024

(54) INTEGRATED URBAN AIR MOBILITY SYSTEM, OPERATION METHOD THEREOF, AND URBAN PUBLIC TRANSPORTATION SYSTEM

(71) Applicant: METROAIR INC., Goyang-si (KR)

(72) Inventor: Hak Yoon Kim, Chungcheongnam-do (KR)

(73) Assignee: METROAIR INC., Goyang-si (KR)

( * ) Notice: Subject to any disclaimer, the term of this patent is extended or adjusted under 35 U.S.C. 154(b) by 55 days.

(21) Appl. No.: 18/114,285

(22) Filed: Feb. 27, 2023

(65) Prior Publication Data
US 2024/0140614 A1    May 2, 2024

(30) Foreign Application Priority Data
Oct. 26, 2022  (KR) .................. 10-2022-0139551

(51) Int. Cl.
| | | |
|---|---|---|
| *B64F 1/222* | (2024.01) | |
| *B64F 1/02* | (2006.01) | |
| *B64F 1/30* | (2006.01) | |
| *B64F 1/36* | (2024.01) | |
| *B64F 5/40* | (2017.01) | |
| *B64U 10/16* | (2023.01) | |
| *B64U 70/99* | (2023.01) | |
| *B64U 101/60* | (2023.01) | |

(52) U.S. Cl.
CPC ............... *B64F 1/222* (2013.01); *B64F 1/02* (2013.01); *B64F 1/30* (2013.01); *B64F 1/362* (2013.01); *B64F 5/40* (2017.01); *B64U 10/16* (2023.01); *B64U 70/99* (2023.01); *B64U 2101/60* (2023.01)

(58) Field of Classification Search
CPC ... B64F 1/30; B64F 1/222; B64F 1/22; B64U 2101/61; B64U 2101/60
See application file for complete search history.

(56) References Cited

U.S. PATENT DOCUMENTS

| | | | |
|---|---|---|---|
| 4,325,317 A * | 4/1982 | Wilford ................ | B63G 11/00 244/114 R |
| 2019/0100331 A1 * | 4/2019 | Wright .................. | B64U 10/20 |

FOREIGN PATENT DOCUMENTS

| | | | | |
|---|---|---|---|---|
| KR | 10-2022-0129849 A | | 9/2022 | |
| WO | WO-2018122821 A2 * | | 7/2018 | ........... B64C 39/026 |

* cited by examiner

*Primary Examiner* — Philip J Bonzell
*Assistant Examiner* — Eric Acosta
(74) *Attorney, Agent, or Firm* — Revolution IP, PLLC

(57) ABSTRACT

An integrated urban air mobility system includes: an air taxi including a boarding capsule adapted to allow a passenger to board or alight from the boarding capsule in a boarding/alighting area, and an aircraft adapted to dock with the boarding capsule and flying in an airway; and a vertiport having an outer wall defining an interior space, the interior space including an air taxi movement space in which the air taxi moves, a boarding capsule movement space in which the boarding capsule moves, and an aircraft movement space in which the aircraft moves.

11 Claims, 3 Drawing Sheets

INTEGRATED URBAN AIR MOBILITY SYSTEM, OPERATION METHOD THEREOF, AND URBAN PUBLIC TRANSPORTATION SYSTEM

FIELD

The present invention relates to an integrated urban air mobility system, an operation method thereof, and an urban public transportation system. More particularly, the present invention relates to an integrated urban air mobility system for efficiently realizing urban air mobility through operation of air taxis and vertiports, a method of operating the same, and an urban public transportation system including the same.

BACKGROUND

In modern society, as the population increases, movement of people is rapidly increasing and various transportation means have been developed.

Among various transportation means including passenger planes, passenger ships, trains, buses, and the like, automobiles including taxis are the most popular transportation means and cause traffic congestion problems in densely populated downtown areas.

Recently, as the technical possibility of air taxis has emerged, many designers and companies are developing air taxis. Air taxis are favored by many people with the expectation that they can alleviate traffic congestion in downtown areas.

In order for air taxis to take off and land, it is necessary to build a dedicated take-off and landing site, that is, a vertiport, together with development of a method that can operate the air taxis and the vertiports in downtown areas while efficiently realizing urban air mobility.

RELATED LITERATURE

Patent Document

Korean Patent Laid-open Publication No. 10-2022-0129849 (Title of Invention: Drone taxi system using multi-agent reinforcement learning and drone taxi operation method using the same, Publication date: Sep. 26, 2022)

SUMMARY

Embodiments of the present invention are conceived to solve such problems in the art and it is an object of the present invention to provide an integrated urban air mobility system for efficiently realizing urban air mobility through operation of air taxis and vertiports, a method of operating the same, and an urban public transportation system including the same.

It will be understood that objects of the present invention are not limited to the above. The above and other objects of the present invention will become apparent to those skilled in the art from the detailed description of the following embodiments in conjunction with the accompanying drawings.

In accordance with one aspect of the present invention, an integrated urban air mobility system includes: an air taxi including a boarding capsule adapted to allow a passenger to board or alight from the boarding capsule in a boarding/alighting area, and an aircraft adapted to dock with the boarding capsule and flying in an airway; and a vertiport having an outer wall defining an interior space, the interior space including an air taxi movement space in which the air taxi moves, a boarding capsule movement space in which the boarding capsule moves, and an aircraft movement space in which the aircraft moves, wherein the vertiport further includes a take-off station having an upper end exposed at an upper end thereof from an upper surface of the outer wall and moving in an upward/downward direction, and a landing station disposed adjacent to the take-off station, exposed at an upper end thereof through the upper surface of the outer wall and moving in the upward/downward direction; and wherein the air taxi movement space includes a first air taxi movement space connecting a docking area, in which the boarding capsule and the aircraft are allowed to dock with each other, to a first space defined on the upper surface of the outer wall such that the take-off station is exposed to the first space, and a second air taxi movement space connecting a docking release area, in which docking between the boarding capsule and the aircraft is released, to a second space defined on the upper surface of the outer wall such that the landing station is exposed to the second space, the first air taxi movement space and the second air taxi movement space being formed in the upward/downward direction and being arranged parallel to each other.

In one embodiment, the aircraft movement space may include: an aircraft horizontal movement space allowing the aircraft to move horizontally in the docking release area; and an aircraft vertical movement space connected to the aircraft horizontal movement space and allowing the aircraft to be conveyed to the docking area.

In one embodiment, the vertiport may further include: an aircraft maintenance compartment disposed in the aircraft vertical movement space for washing, overhauling and charging of the aircraft, a boarding capsule maintenance compartment for washing, overhauling and charging of the boarding capsule, and an aircraft rack storing the aircraft having passed through the aircraft maintenance compartment.

In one embodiment, the boarding capsule movement space may include a first boarding capsule movement space in which the boarding capsule is moved to the docking area after a passenger boards the boarding capsule in the boarding/alighting area, a second boarding capsule movement space in which the boarding capsule undocked from the aircraft in the docking release area is moved to the boarding/alighting area, and a third boarding capsule movement space in which the boarding capsule is moved to the boarding/alighting area via the boarding capsule maintenance compartment after a passenger alights from the boarding capsule in the boarding/alighting area.

In one embodiment, the vertiport may further include a take-off assistance device provided to the take-off station to assist the air taxi entering the airway while pushing the air taxi in a forward direction of the air taxi.

In one embodiment, the vertiport may further include a landing assistance device provided to the landing station to hook the air taxi having landed on the landing station.

In one embodiment, the vertiport may further include: a first boarding capsule-conveying device conveying the boarding capsule from the boarding/alighting area to the docking area; a first air taxi-conveying device conveying the air taxi, the take-off station and the take-off assistance device from the docking area to the first space; a second air taxi-conveying device conveying the air taxi, the landing station and the landing assistance device from the second space to the docking release area; a second boarding capsule-conveying device conveying the undocked boarding capsule from the docking release area to the boarding/alighting area; and an aircraft-conveying device conveying the undocked aircraft from the docking release area to the docking area.

In one embodiment, the landing assistance device may include: a first holder holding the aircraft; and a second holder holding the boarding capsule, wherein the aircraft and the boarding capsule may be released from a state of being caught by the first holder and the second holder in the docking release area, respectively.

In one embodiment, the vertiport may further include: a first rotating device rotating the take-off station to change a location of the take-off station based on weather information; and a second rotating device rotating the landing station to change a location of the landing station based on the weather information.

In one embodiment, the aircraft may include: a body; and a rim foil provided to the body to have a through-hole and provided with a propeller inside the through-hole.

In accordance with another aspect of the present invention, a method of operating the integrated urban air mobility system includes: a first boarding capsule-conveying step in which the boarding capsule with a passenger boarded thereon is conveyed from the boarding/alighting area to the docking area by the first boarding capsule-conveying device; a docking step in which a controller controls the boarding capsule and the aircraft to dock with each other in the docking area; a first air taxi-conveying step in which the air taxi with the boarding capsule and the aircraft coupled to each other is conveyed to the first space by the first air taxi-conveying device; a second air taxi-conveying step in which the air taxi having landed on the landing station is conveyed from the second space to the docking release area by the second air taxi-conveying device; a docking release step in which the controller controls the boarding capsule and the aircraft to be undocked from each other in the docking release area; a second boarding capsule-conveying step in which the undocked boarding capsule is conveyed from the docking release area to the boarding/alighting area by the second boarding capsule-conveying device; and an aircraft-conveying step in which the undocked aircraft is conveyed from the docking release area to the docking area by the aircraft-conveying device.

In one embodiment, the operation method may further include: an air taxi-launching step in which the air taxi disposed on the take-off station is pushed in a forward direction of the air taxi by the take-off assistance device so as to enter the airway.

In one embodiment, the operation method may further include: an air taxi-catching step in which the air taxi having landed on the landing station is hooked and caught by the landing assistance device.

In one embodiment, the operation method may further include: a first rotating step in which the take-off station is rotated by the first rotating device to change a location of the take-off station based on weather information, and a second rotating step in which weather the landing station is rotated by the second rotating device to change a location of the landing station based on the weather information.

In accordance with a further aspect of the present invention, an urban public transportation system includes: the integrated urban air mobility system; and a road vehicle selectively coupled to the boarding capsule to drive on land.

According to embodiments of the present invention, an interior space of the vertiport may be divided into spaces in which the air taxi, the boarding capsule, and the aircraft move, respectively, specifically into spaces according to traveling routes along which the air taxi, the boarding capsule, and the aircraft move, respectively.

As a result, the vertiport can facilitate management and control of each of the air taxi, the boarding capsule, and the aircraft to allow rapid and safe operation of multiple air taxis, thereby realizing public transportation through operation of the multiple air taxis.

In addition, the urban public transportation system can expand a current metropolitan area while securing greater convenience through efficient movement in the metropolitan area.

It should be understood that advantageous effects of the present invention are not limited to the above and include any advantageous effects conceivable from the features disclosed in the detailed description of the invention or the appended claims.

DRAWINGS

The above and other aspects, features, and advantages of the present invention will become apparent from the detailed description of the following embodiments in conjunction with the accompanying drawings.

DETAILED DESCRIPTION

Hereinafter, exemplary embodiments of the present invention will be described in detail with reference to the accompanying drawings.

Figure 1:
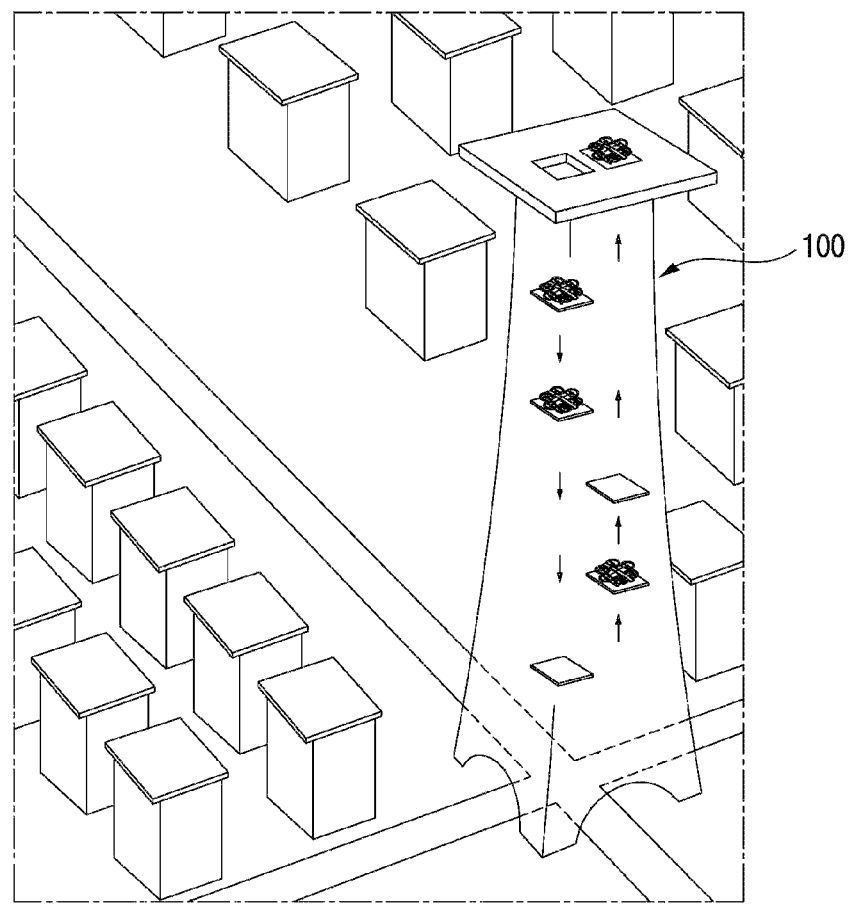
FIG. 1 is an overall diagram of an integrated urban air mobility system according to one embodiment of the present invention.
Figure 2:
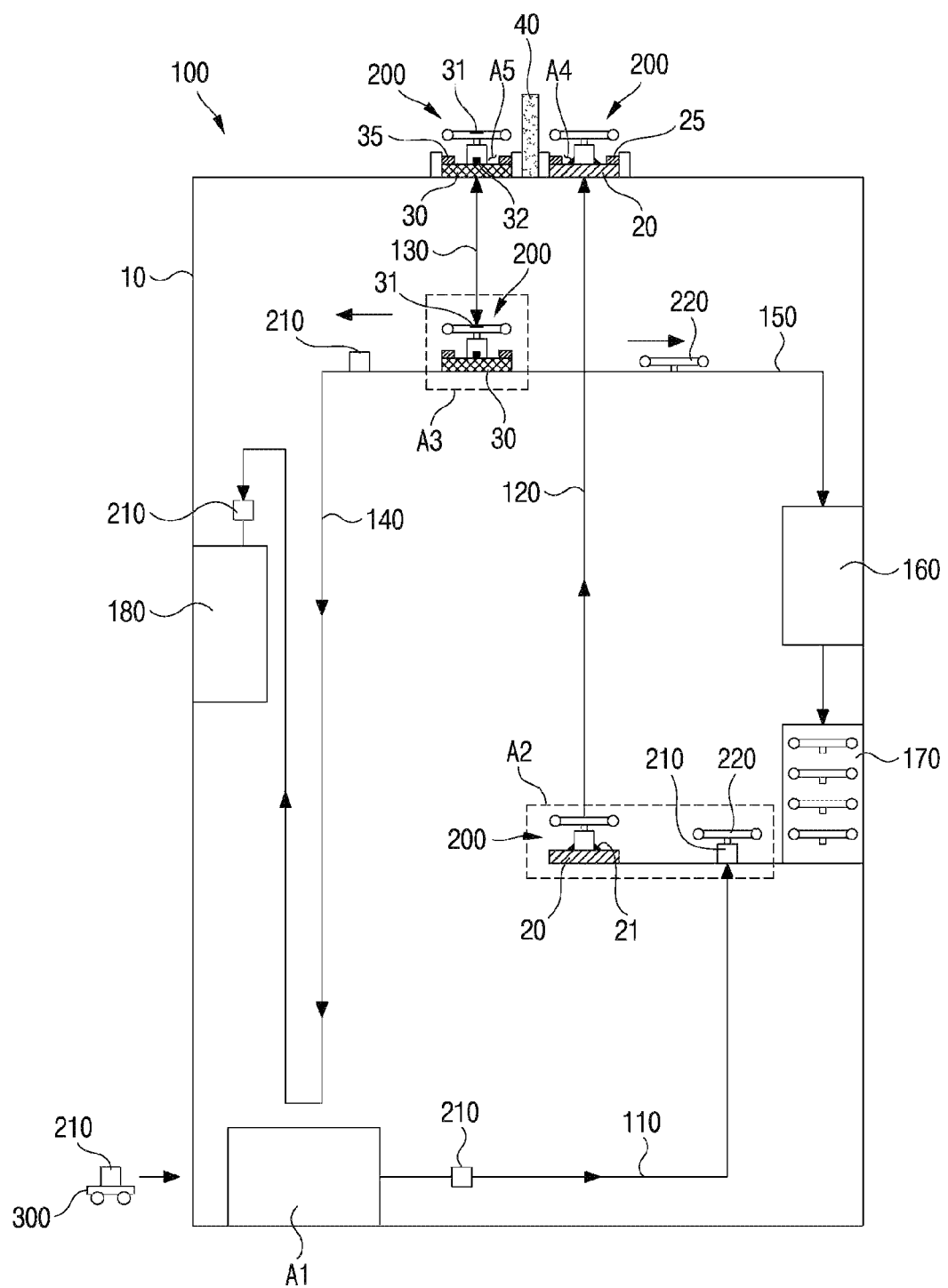
FIG. 2 is a conceptual view of the integrated urban air mobility system according to the embodiment of the present invention.
Figure 3:
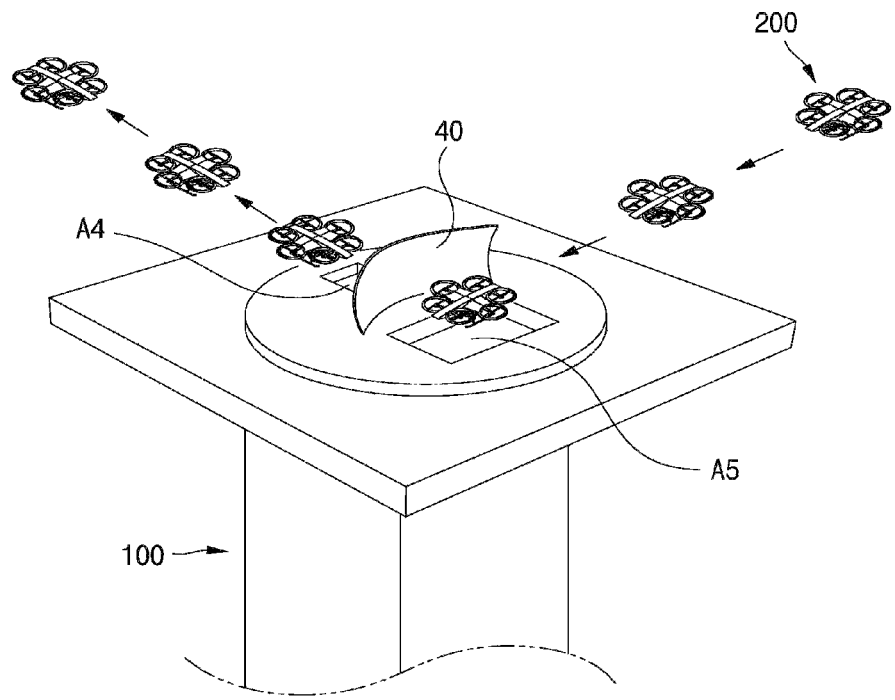
FIG. 3 is a top perspective view of a vertiport of the integrated urban air mobility system according to the embodiment of the present invention.
Figure 4:
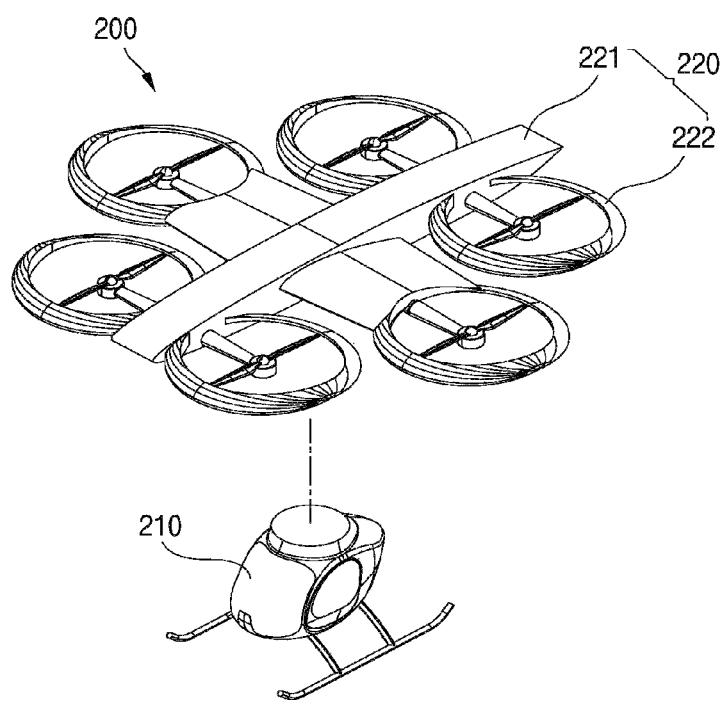
FIG. 4 is a view of an air taxi of the integrated urban air mobility system according to the embodiment of the present invention.

FIG. 1 is an overall diagram of an integrated urban air mobility system according to one embodiment of the present invention; FIG. 2 is a conceptual view of the integrated urban air mobility system according to the embodiment of the present invention; FIG. 3 is a top perspective view of a vertiport of the integrated urban air mobility system according to the embodiment of the present invention; and FIG. 4 is a view of an air taxi of the integrated urban air mobility system according to the embodiment of the present invention.

Referring to FIG. 1 to FIG. 4, an integrated urban air mobility system according to one embodiment of the invention includes an air taxi 200 and a vertiport 100.

The air taxi 200 includes: a boarding capsule 210 adapted to allow a passenger to board or alight from the boarding capsule 210 in a boarding/alighting area A1; and an aircraft 220 adapted to dock with the boarding capsule 210 and flying in an airway.

The boarding capsule 210 may be formed in a typical helicopter fuselage shape to allow a passenger to board or alight, without being limited thereto.

It is desirable that the aircraft 220 be formed in a shape not exposing a propeller, which can provide a visual threat to people. Referring to FIG. 4, the aircraft 220 may include: a body 221; and a rim foil 222 provided to the body 221 to have a through-hole and provided with a propeller inside the through-hole. That is, since the aircraft 220 includes the rim foil 222 surrounding the propeller, the aircraft 220 can prevent the propeller from being visually exposed, thereby minimizing accidents and damage to the propeller due to surrounding obstacles.

The boarding capsule 210 and the aircraft 220 may be provided with energy storage devices, respectively, and may exchange energy with each other.

The vertiport 100 may be built vertically on roads or intersections of the roads such that vehicles can pass thereunder, and may be built to have a higher height than surrounding buildings, as shown in FIG. 1. As such, as the vertiport 100 is built, a passenger using the air taxi 200 can approach the vertiport 100 along pavement.

Referring to FIG. 2, the vertiport 100 may include an outer wall 10, a take-off station 20, a landing station 30, an aircraft maintenance compartment 160, a boarding capsule maintenance compartment 180, an aircraft rack 170, a take-off assistance device 21, and a landing assistance device.

The outer wall 10 defines an interior space of the vertiport 100. Here, the interior space includes an air taxi movement space in which the air taxi 200 moves, a boarding capsule movement space in which the boarding capsule 210 moves, and an aircraft movement space in which the aircraft 220 moves. Each of the movement spaces will be described below.

The take-off station 20 is a place at which the air taxi 200 takes off from the vertiport. The take-off station 20 is exposed at an upper end thereof from an upper surface of the outer wall 10 and moves in an upward/downward direction. That is, the air taxi 200 may take off from the vertiport 100 through the take-off station 20, which moves in the upward/downward direction, in a state of being exposed from the vertiport 100.

The landing station 30 is a place at which the air taxi lands and is disposed adjacent to the take-off station 20. The landing station 30 is exposed at an upper end thereof from the upper surface of the outer wall 10 and moves in the upward/downward direction. That is, the air taxi 200 may enter the vertiport 100 through the landing station 30, which moves in the upward/downward direction, after the air taxi 200 lands on the landing station 30.

The aircraft maintenance compartment 160 may be disposed in an aircraft vertical movement space for washing, overhauling and charging of the aircraft 220. In the aircraft maintenance compartment 160, the aircraft 220 having finished flight and undocked from the boarding capsule 210 is overhauled to prepare for the next flight.

The boarding capsule maintenance compartment 180 is a space for washing, overhauling and charging of the boarding capsule 210. In the boarding capsule maintenance compartment 180, the boarding capsule 210, from which a passenger alights, is overhauled to allow another passenger to board the boarding capsule 210.

The aircraft rack 170 is a rack for storing the aircraft 220 and may store the aircraft 220 having finished flight preparation through the aircraft maintenance compartment 160.

The take-off assistance device 21 is provided to the take-off station 20 to assist the air taxi 200 entering an airway while pushing the air taxi 200 in a forward direction of the air taxi 200.

That is, the take-off assistance device 21 assists the air taxi 200 in rapid and safe entrance into the airway, whereby the air taxi 200 can rapidly escape from surroundings of the vertiport 100.

The landing assistance device may be provided to the landing station 30 to hook the air taxi 200 having landed on the landing station 30, and may include a first holder 31 holding the aircraft 220 and a second holder 32 holding the boarding capsule 210.

The first holder 31 may hold the rim foil 222 as soon as the air taxi 200 lands on the landing station 30. When the air taxi 200 lands on the landing station 30, the propeller may be in a state of being continuously rotated by inertia. Here, since the first holder 31 can hold the rim foil 222, the first holder 31 can rapidly and safely hold the aircraft 220 even during rotation of the propeller.

That is, the landing assistance device can rapidly hold the air taxi 200 having landed on the landing station 30, whereby the air taxi 200 can rapidly and safely land on the landing station 30 to enter the vertiport 100.

The aircraft 220 and the boarding capsule 210 may be released from the first holder 31 and the second holder 32 in a docking release area A3, respectively.

In addition, the first holder 31 allows the aircraft 220 to move towards an aircraft-conveying device 150 while unholding the aircraft 220 and the second holder 32 allows the boarding capsule 210 to move towards a second boarding capsule-conveying device 130 described below while unholding the boarding capsule 210.

The vertiport 100 may further include: a first boarding capsule-conveying device 110 conveying the boarding capsule 210 from the boarding/alighting area A1 to a docking area A2; a first air taxi-conveying device 120 conveying the air taxi 200, the take-off station 20 and the take-off assistance device 21 from the docking area A2 to a first space A4; a second air taxi-conveying device 130 conveying the air taxi 200, the landing station 30 and the landing assistance device from the second space A5 to the docking release area A3; a second boarding capsule-conveying device 140 conveying the boarding capsule 210 undocked from the aircraft 220 in the docking release area A3 to the boarding/alighting area A1; and an aircraft-conveying device 150 conveying the aircraft 220 undocked from the boarding capsule 210 in the docking release area A3 to the docking area A2.

The conveying devices 110, 120, 130, 140, 150 are conveyance devices, such as rails or elevators, and will be described below together with an air taxi movement space, an aircraft movement space and a boarding capsule movement space.

The air taxi movement space includes a first air taxi movement space and a second air taxi movement space.

The first air taxi movement space connects a docking area A2, in which the boarding capsule 210 and the aircraft 220 are allowed to dock with each other, to the first space A4, which is defined on the upper surface of the outer wall 10 such that the take-off station 220 is exposed to the first space A4. Here, the docking area A2 may be a region adjacent to the aircraft rack 170 and the first air taxi-conveying device 120 may be disposed in the first air taxi movement space.

Specifically, docking between the aircraft 220 stored in the aircraft rack 170 and the boarding capsule 210 which a passenger boards may occur in the docking area A2.

Thereafter, the air taxi 200 obtained through docking between the aircraft 220 and the boarding capsule 210 may be conveyed to the first space A4 together with the take-off station 20 and the take-off assistance device 21 to enter the airway through the first space A4 by the first air taxi-conveying device 120 disposed in the first air taxi movement space.

Here, the first space A4 may be provided with a first shielding plate (not shown). The first shielding plate blocks the first space A4 while the first air taxi-conveying device 120 is not operated, and opens the first space A4 to allow the air taxi 200 to enter the airway through the first space A4 upon operation of the first air taxi-conveying device 120.

The second air taxi movement space connects the docking release area A3, in which docking between the boarding capsule 120 and the aircraft 220 is released, to a second space A5, which is defined on the upper surface of the outer wall 10 such that the landing station 30 is exposed to the second space A5. Here, the docking release area A3 may be a region between the aircraft movement space and the boarding capsule movement space, and the second air taxi-conveying device 130 may be disposed in the second air taxi movement space.

Specifically, the air taxi 200 having landed on the landing station 30 after finishing flight may be conveyed from the second space A5 to the docking release area A3 by the second air taxi-conveying device 130 disposed in the second air taxi movement space.

Here, the second space A5 may be provided with a second shielding plate (not shown). The second shielding plate blocks the second space A5 in normal times and opens the second space A5 to allow the air taxi 200 to enter the vertiport 100 through the second space A5 when the taxi 200 lands on the landing station 30.

Thereafter, the air taxi 200 may be divided into the aircraft 220 and the boarding capsule 210 through release of docking therebetween in the docking release area A3.

The first air taxi movement space and the second air taxi movement space are formed in the upward/downward direction and are arranged parallel to each other. With this structure, multiple air taxis 200 can efficiently take off or land without interference therebetween, thereby enabling simultaneous operation of the multiple air taxis 200.

The aircraft movement space may include an aircraft horizontal movement space and an aircraft vertical movement space.

The aircraft horizontal movement space may be a space for horizontal movement of the aircraft 220 in the docking release area A3 and the aircraft vertical movement space is connected to horizontal movement space and may be a space for conveyance of the aircraft 220 to the docking area A2.

Here, the aircraft horizontal movement space and the aircraft vertical movement space may be provided with the aircraft-conveying device 150.

Specifically, the aircraft 220 undocked from the boarding capsule 210 in the docking release area A3 may be horizontally moved by the aircraft-conveying device 150 disposed in the aircraft horizontal movement space.

Thereafter, the aircraft 220 may enter the aircraft rack 170 to be stored therein through the aircraft maintenance compartment 160 disposed in the aircraft vertical movement space while being vertically conveyed by the aircraft-conveying device 150 disposed in the aircraft vertical movement space.

The boarding capsule movement space may include a first boarding capsule movement space, a second boarding capsule movement space, and a third boarding capsule movement space.

The first boarding capsule movement space may be a space for movement of the boarding capsule 210, which the passenger boards, from the boarding/alighting area A1 to the docking area A2. Here, the first boarding capsule-conveying device 110 may be disposed in the first boarding capsule movement space.

Specifically, a passenger may board the boarding capsule 210 in the boarding/alighting area A1. Thereafter, the boarding capsule 210 which the passenger boards may be conveyed to the docking area A2 by the first boarding capsule-conveying device 110 disposed in the first boarding capsule movement space.

The second boarding capsule movement space may be a space for movement of the boarding capsule 210 undocked from the aircraft 220 in the docking release area A3 to the boarding/alighting area A1. Here, the second boarding capsule-conveying device 140 may be disposed in the second boarding capsule movement space.

Specifically, the boarding capsule 210 undocked from the aircraft 220 in the docking release area A3 may be moved to the boarding/alighting area A1 by the second boarding capsule-conveying device 140 in the second boarding capsule movement space and a passenger may alight from the boarding capsule 210 in the boarding/alighting area A1.

The third boarding capsule movement space may be a space for movement of the boarding capsule 210 from the boarding/alighting area A1 to the boarding/alighting area A1 through the boarding capsule maintenance compartment 180 after a passenger alights from the boarding capsule 210 in the boarding/alighting area A1. Here, the second boarding capsule-conveying device 140 may extend in the third boarding capsule movement space.

Specifically, after the passenger alights from the boarding capsule 210 in the boarding/alighting area A1, the boarding capsule 210 may be conveyed to the boarding capsule maintenance compartment 180 by the second boarding capsule-conveying device 140 extending in the third boarding capsule movement space.

After maintenance of the boarding capsule 210, the boarding capsule 210 may be conveyed again to the boarding/alighting area A1 by the second boarding capsule-conveying device 140, which extends in the third boarding capsule movement space, to allow a passenger to alight from the boarding capsule 210 in the boarding/alighting area A1, and if a passenger does not alight from the boarding capsule 210, the boarding capsule 210 may be conveyed again to the boarding capsule maintenance compartment 180 in the third boarding capsule movement space.

On the other hand, the aircraft movement space and the boarding capsule movement space may be disposed under the second air taxi movement space, and the first boarding capsule movement space may be disposed under the first air taxi movement space. With this arrangement, the interior space of the vertiport 100 built in the vertical direction may be efficiently used.

As such, the interior space of the vertiport 100 may be divided into spaces for movement of the air taxi 200, the boarding capsule 210, and the aircraft 220, specifically into spaces corresponding to movement paths of the air taxi 200, the boarding capsule 210, and the aircraft 220, respectively.

As a result, the vertiport 100 allows rapid and safe operation of multiple air taxis 200 through easier management and control of each of the air taxi 200, the boarding capsule 210, and the aircraft 220, thereby realizing public transportation through operation of the multiple air taxis.

Further, the vertiport 100 may further include: a first rotating device 25 rotating the take-off station 20 to change a location of the take-off station 20 based on weather information; and a second rotating device 35 rotating the landing station 30 to change a location of the landing station 30 based on the weather information.

The first rotating device 25 and the second rotating device 35 may be disposed in the first space A4 and the second space A5 to rotate the take-off station 20 and the landing station 30 based on the weather information, specifically, a wind direction, respectively.

As a result, the air taxi 200 can safely take off or land through normal take-off or landing.

In addition, the vertiport 100 may include a blocking wall 40 between the first space A4 and the second space A5. The blocking wall 40 can prevent abnormal landing of the air taxi 200 in the first space A4 upon landing of the air taxi 200. Such a blocking wall 40 may be formed in a mesh shape to relieve impact applied to the air taxi 200 and a passenger in the air taxi 200 upon collision of the air taxi 200 with the blocking wall 40.

The integrated urban air mobility system may further include a helipad (not shown) disposed adjacent to the vertiport 100 to allow emergency landing of the air taxi 200 on the helipad when the vertiport 100 cannot be used.

The helipad may be installed on the roof of a building adjacent to the vertiport 100. That is, the helipad may be installed throughout downtown areas and the air taxi 200 can make an emergency landing on the helipad in case of an emergency.

In addition, the integrated urban air mobility system may further include a passenger handling system that manages boarding, alighting and booking of passengers, and a control system that manages takeoff, landing, and flight of the air taxi 200.

Through the passenger handling system and the control system, full control and calculation of the air taxi 200 can be achieved through control of the air taxi 200 in real time and a flight schedule of the air taxi 200 can be generated to reflect a passenger schedule.

In addition, the boarding capsule 210 and the aircraft 220 may be moved to a target location inside the vertiport 100 according to a real-time booking request through the passenger handling system, and the take-off station 20 and the landing station 30 may be moved corresponding to the air taxi 200 that takes off or lands through the control system.

A method of operating the integrated urban air mobility system according to one embodiment includes a first boarding capsule-conveying step, a docking step, a first air taxi-conveying step, a second air taxi-conveying step, a docking release step, a second boarding capsule-conveying step, and an aircraft-conveying step.

In the first boarding capsule-conveying step, the boarding capsule 210 with a passenger boarded thereon is conveyed from the boarding/alighting area A1 to the docking area A2 by the first boarding capsule-conveying device 110.

Specifically, when a passenger boards the boarding capsule 210 after finishing a simple procedure in the boarding/alighting area A1, the boarding capsule 210 is conveyed to the docking area A2 by the first boarding capsule-conveying device 110. Here, during conveyance of the boarding capsule 210, various precautions and information may be broadcast to the passenger to help the passenger to prepare for takeoff.

In the docking step, a controller (not shown) controls the boarding capsule 210 and the aircraft 220 to dock with each other in the docking area A2.

The controller may be a comprehensive control and integrated computer facility at a safe point placed at a center of the vertiport 100. In addition, the controller controls the air taxi 200 to prepare for takeoff by docking the aircraft 220 and the boarding capsule 210, which have been waiting in advance in the docking step.

In the first air taxi-conveying step, the air taxi 200 with the boarding capsule 210 and the aircraft 220 coupled to each other is conveyed to the first space A4 by the first air taxi-conveying device 120.

That is, the air taxi 200 may be conveyed to the first space A4 to takeoff in the first air taxi-conveying step.

Here, the operation method may further include an air taxi-launching step in which the air taxi 200 disposed on the take-off station 20 is pushed in a forward direction of the air taxi 200 by the take-off assistance device 21 so as to enter the airway.

That is, the air taxi 200 can rapidly and safely enter the airway in the air taxi-launching step in which the air taxi 200 is pushed.

In the second air taxi-conveying step, the air taxi 200 having landed on the landing station 30 is conveyed from the second space A5 to the docking release area A3 by the second air taxi-conveying device 130.

That is, in the second air taxi-conveying step, the air taxi 200 having landed on the landing station 30 is moved to enter the vertiport 100 and conveyed to the docking release area A3 by the second air taxi-conveying device 130.

Here, the operation method may further include: an air taxi-catching step in which the air taxi 200 having landed on the landing station 30 is hooked and caught by the landing assistance device 31, 32.

That is, the air taxi 200 can safely land on the landing station 30 through the air taxi catching step in which the air taxi 200 is hooked and caught.

In the docking release step, the controller controls the boarding capsule 210 and the aircraft 220 to be undocked from each other in the docking release area A3.

In the docking release step, docking between the aircraft 220 and the boarding capsule 210 is released to allow each of the aircraft 220 and the boarding capsule 210 to prepare for conveyance by the aircraft-conveying device 150 and the second boarding capsule-conveying device 140, respectively.

In the second boarding capsule-conveying step, the undocked boarding capsule 210 is conveyed from the docking release area A3 to the boarding/alighting area A1 by the second boarding capsule-conveying device 140.

When the boarding capsule 210 is conveyed to the boarding/alighting area A1 in the second boarding capsule-conveying step, a passenger can alight from the boarding capsule 210.

In the aircraft-conveying step, the undocked aircraft 220 is conveyed from the docking release area A3 to the docking area A2 by the aircraft-conveying device 150.

Specifically, the aircraft 220 having finished flight and undocked from the boarding capsule 210 is conveyed by the aircraft-conveying device 150 to be overhauled in the aircraft maintenance compartment 160. Thereafter, the aircraft 220 may be stored in the aircraft rack 170 or may prepare for docking with the boarding capsule 210, from which a passenger alights, in the docking area A2.

The operation method may further include a first rotating step in which the take-off station 20 is rotated by the first rotating device 25 to change a location of the take-off station 20 based on weather information, and a second rotating step in which weather the landing station 30 is rotated by the second rotating device 35 to change a location of the landing station 30 based on the weather information.

In the first rotating step and the second rotating step, the take-off station 20 and the landing station 30 are rotated based on the weather information, specifically, a wind direction, such that the air taxi 200 can take off or land through normal take-off or landing.

An urban public transportation system according to one embodiment includes the integrated urban air mobility system and a road vehicle 300.

The road vehicle 300 may be selectively coupled to the boarding capsule 210 to drive on land.

For example, for long-distance travel from a large city to a suburb, a passenger can board the boarding capsule 210 coupled to the road vehicle 300 in the vertiport 100 in the large city. Thereafter, in the vertiport 100, the boarding capsule 210 may be separated from the road vehicle 300 and then dock with the aircraft 220 to operate as the air taxi 200. In addition, upon arriving at a suburban vertiport, the boarding capsule 210 is undocked from the aircraft 220 and coupled to another road vehicle such that a passenger can drive the road vehicle to travel in the same driving mode as a car.

Therefore, the urban public transportation system expands a current metropolitan area to allow smooth movement within the area.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

<List of Reference numerals>

10: Outer wall
20: Take-off station
21: Take-off assistance device
25: First rotating device
30: Landing station
31: First holder
32: Second holder
35: Second rotating device
40: Blocking wall
100: Vertiport
110: First boarding capsule-conveying device
120: First air taxi-conveying device
130: Second air taxi-conveying device
140: Second boarding capsule-conveying device
150: Aircraft-conveying device
160: Aircraft maintenance compartment
170: Aircraft rack
180: Boarding capsule maintenance compartment
200: Air taxi
210: Boarding capsule
220: Aircraft
300: Road vehicle
A1: Boarding/alighting area
A2: Docking area
A3: Docking release area
A4: First space
A5: Second space

The invention claimed is:

1. An integrated urban air mobility system comprising:
an air taxi comprising a boarding capsule adapted to allow a passenger to board or alight from the boarding capsule in a boarding/alighting area, and an aircraft adapted to dock with the boarding capsule and flying in an airway; and
a vertiport having an outer wall defining an interior space, the interior space comprising an air taxi movement space in which the air taxi moves, a boarding capsule movement space in which the boarding capsule moves, and an aircraft movement space in which the aircraft moves,
wherein the vertiport further comprises: a take-off station having an upper end exposed at an upper end thereof from an upper surface of the outer wall and moving in an upward/downward direction; and a landing station disposed adjacent to the take-off station, exposed at an upper end thereof through the upper surface of the outer wall and moving in the upward/downward direction, and
wherein the air taxi movement space comprises:
a first air taxi movement space connecting a docking area, in which the boarding capsule and the aircraft are allowed to dock with each other, to a first space defined on the upper surface of the outer wall such that the take-off station is exposed to the first space; and
a second air taxi movement space connecting a docking release area, in which docking between the boarding capsule and the aircraft is released, to a second space defined on the upper surface of the outer wall such that the landing station is exposed to the second space,
the first air taxi movement space and the second air taxi movement space being formed in the upward/downward direction and being arranged parallel to each other,
wherein the aircraft movement space comprises:
an aircraft horizontal movement space allowing the aircraft to move horizontally in the docking release area; and
an aircraft vertical movement space connected to the aircraft horizontal movement space and allowing the aircraft to be conveyed to the docking are, and
wherein the vertiport further comprises:
an aircraft maintenance compartment disposed in the aircraft vertical movement space for washing, overhauling and charging of the aircraft;
a boarding capsule maintenance compartment for washing, overhauling and charging of the boarding capsule; and
an aircraft rack storing the aircraft having passed through the aircraft maintenance compartment.

2. The integrated urban air mobility system according to claim 1, wherein the boarding capsule movement space comprises:
a first boarding capsule movement space in which the boarding capsule is moved to the docking area after a passenger boards the boarding capsule in the boarding/alighting area;
a second boarding capsule movement space in which the boarding capsule undocked from the aircraft in the docking release area is moved to the boarding/alighting area; and
a third boarding capsule movement space in which the boarding capsule is moved to the boarding/alighting area via the boarding capsule maintenance compartment after a passenger alights from the boarding capsule in the boarding/alighting area.

3. The integrated urban air mobility system according to claim 1, wherein the vertiport further comprises:
a first rotating device rotating the take-off station to change a location of the take-off station based on weather information; and
a second rotating device rotating the landing station to change a location of the landing station based on the weather information.

4. The integrated urban air mobility system according to claim 1, wherein the aircraft comprises:
- a body; and
- a rim foil provided to the body to have a through-hole and provided with a propeller inside the through-hole.

5. An urban public transportation system comprising:
- the integrated urban air mobility system according to claim 1; and
- a road vehicle selectively coupled to the boarding capsule to drive on land.

6. An integrated urban air mobility system comprising:
- an air taxi comprising a boarding capsule adapted to allow a passenger to board or alight from the boarding capsule in a boarding/alighting area, and an aircraft adapted to dock with the boarding capsule and flying in an airway; and
- a vertiport having an outer wall defining an interior space, the interior space comprising an air taxi movement space in which the air taxi moves, a boarding capsule movement space in which the boarding capsule moves, and an aircraft movement space in which the aircraft moves,
- wherein the vertiport further comprises: a take-off station having an upper end exposed at an upper end thereof from an upper surface of the outer wall and moving in an upward/downward direction; and a landing station disposed adjacent to the take-off station, exposed at an upper end thereof through the upper surface of the outer wall and moving in the upward/downward direction, and
- wherein the air taxi movement space comprises:
- a first air taxi movement space connecting a docking area, in which the boarding capsule and the aircraft are allowed to dock with each other, to a first space defined on the upper surface of the outer wall such that the take-off station is exposed to the first space; and
- a second air taxi movement space connecting a docking release area, in which docking between the boarding capsule and the aircraft is released, to a second space defined on the upper surface of the outer wall such that the landing station is exposed to the second space,
- the first air taxi movement space and the second air taxi movement space being formed in the upward/downward direction and being arranged parallel to each other,
- wherein the vertiport further comprises:
- a take-off assistance device provided to the take-off station to assist the air taxi entering the airway while pushing the air taxi in a forward direction of the air taxi;
- a landing assistance device provided to the landing station to hook the air taxi having landed on the landing station;
- a first boarding capsule-conveying device conveying the boarding capsule from the boarding/alighting area to the docking area;
- a first air taxi-conveying device conveying the air taxi, the take-off station and the take-off assistance device from the docking area to the first space;
- a second air taxi-conveying device conveying the air taxi, the landing station and the landing assistance device from the second space to the docking release area;
- a second boarding capsule-conveying device conveying the undocked boarding capsule from the docking release area to the boarding/alighting area; and
- an aircraft-conveying device conveying the undocked aircraft from the docking release area to the docking area.

7. A method of operating the integrated urban air mobility system according to claim 6, comprising:
- a first boarding capsule-conveying step in which the boarding capsule with a passenger boarded thereon is conveyed from the boarding/alighting area to the docking area by the first boarding capsule-conveying device;
- a docking step in which a controller controls the boarding capsule and the aircraft to dock with each other in the docking area;
- a first air taxi-conveying step in which the air taxi with the boarding capsule and the aircraft coupled to each other is conveyed to the first space by the first air taxi-conveying device;
- a second air taxi-conveying step in which the air taxi having landed on the landing station is conveyed from the second space to the docking release area by the second air taxi-conveying device;
- a docking release step in which the controller controls the boarding capsule and the aircraft to be undocked from each other in the docking release area;
- a second boarding capsule-conveying step in which the undocked boarding capsule is conveyed from the docking release area to the boarding/alighting area by the second boarding capsule-conveying device; and
- an aircraft-conveying step in which the undocked aircraft is conveyed from the docking release area to the docking area by the aircraft-conveying device.

8. The operation method according to claim 7, further comprising:
- an air taxi-launching step in which the air taxi disposed on the take-off station is pushed in a forward direction of the air taxi by the take-off assistance device so as to enter the airway.

9. The operation method according to claim 7, further comprising:
- an air taxi-catching step in which the air taxi having landed on the landing station is hooked and caught by the landing assistance device.

10. The operation method according to claim 7, further comprising:
- a first rotating step in which the take-off station is rotated by the first rotating device to change a location of the take-off station based on weather information; and
- a second rotating step in which weather the landing station is rotated by the second rotating device to change a location of the landing station based on the weather information.

11. An integrated urban air mobility system comprising:
- an air taxi comprising a boarding capsule adapted to allow a passenger to board or alight from the boarding capsule in a boarding/alighting area, and an aircraft adapted to dock with the boarding capsule and flying in an airway; and
- a vertiport having an outer wall defining an interior space, the interior space comprising an air taxi movement space in which the air taxi moves, a boarding capsule movement space in which the boarding capsule moves, and an aircraft movement space in which the aircraft moves,
- wherein the vertiport further comprises: a take-off station having an upper end exposed at an upper end thereof from an upper surface of the outer wall and moving in an upward/downward direction; and a landing station disposed adjacent to the take-off station, exposed at an upper end thereof through the upper surface of the outer wall and moving in the upward/downward direction, and wherein the air taxi movement space comprises:

a first air taxi movement space connecting a docking area, in which the boarding capsule and the aircraft are allowed to dock with each other, to a first space defined on the upper surface of the outer wall such that the take-off station is exposed to the first space; and a second air taxi movement space connecting a docking release area, in which docking between the boarding capsule and the aircraft is released, to a second space defined on the upper surface of the outer wall such that the landing station is exposed to the second space, the first air taxi movement space and the second air taxi movement space being formed in the upward/downward direction and being arranged parallel to each other, wherein the vertiport further comprises:

a take-off assistance device provided to the take-off station to assist the air taxi entering the airway while pushing the air taxi in a forward direction of the air taxi;

a landing assistance device provided to the landing station to hook the air taxi having landed on the landing station, wherein the landing assistance device comprises: a first holder holding the aircraft; and a second holder holding the boarding capsule, the aircraft and the boarding capsule being released from a state of being caught by the first holder and the second holder in the docking release area, respectively.

* * * * *